May 6, 1930. F. STREICH ET AL 1,757,098
MIXING MACHINE
Filed March 14, 1929 4 Sheets-Sheet 1

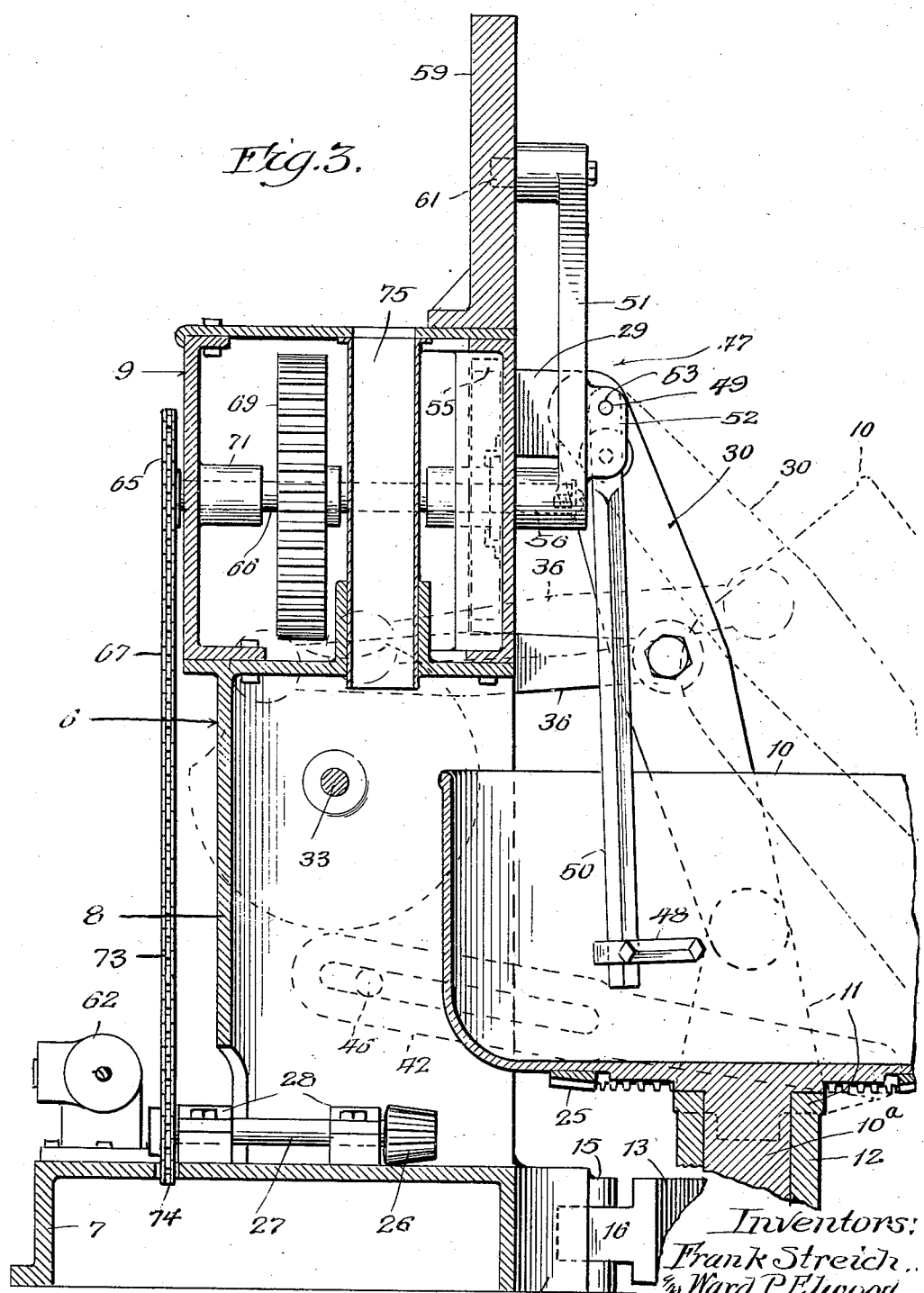

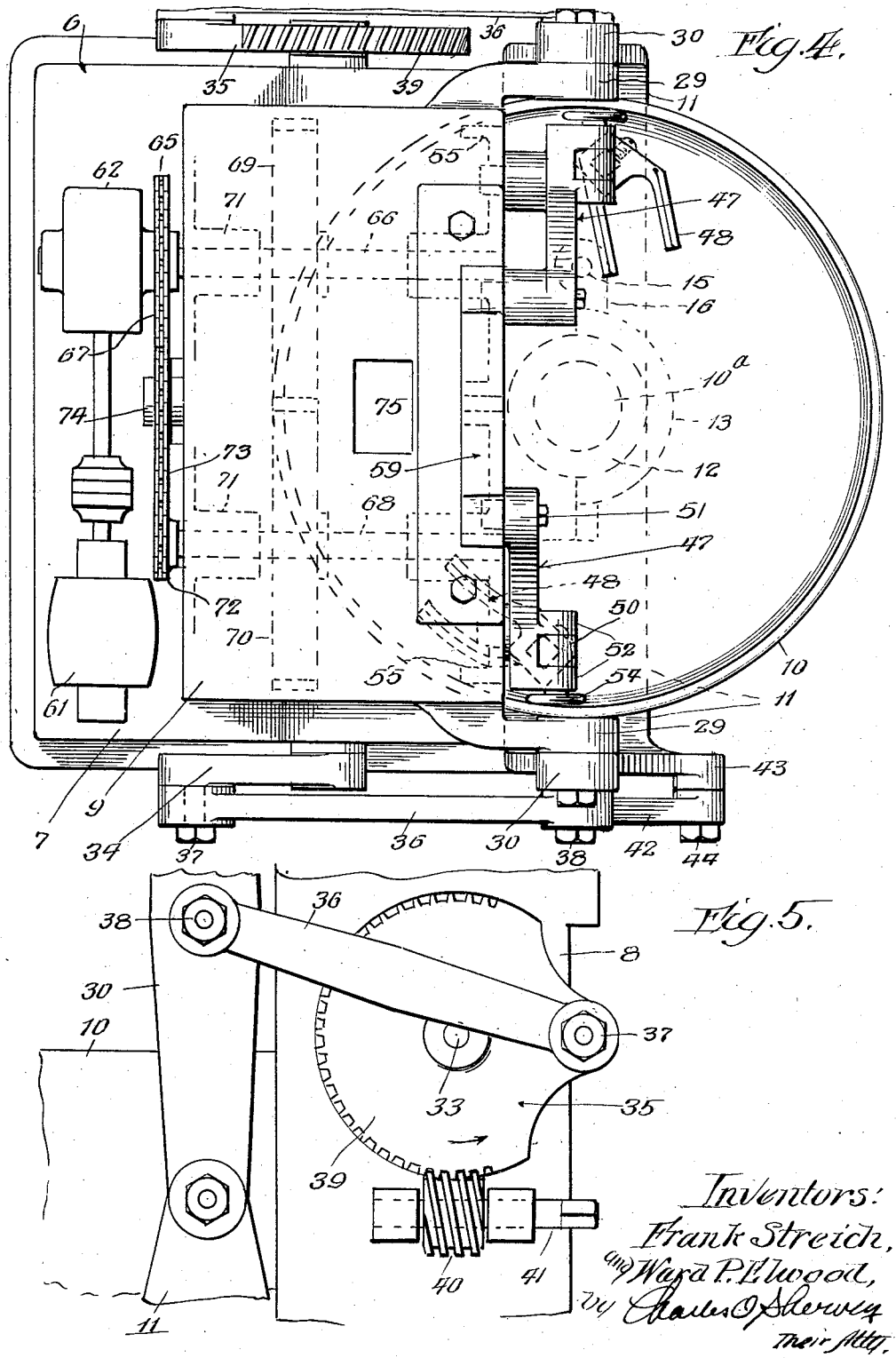

Patented May 6, 1930

1,757,098

UNITED STATES PATENT OFFICE

FRANK STREICH AND WARD P. ELWOOD, OF JOLIET, ILLINOIS, ASSIGNORS TO UNION MACHINERY COMPANY, OF JOLIET, ILLINOIS, A CORPORATION OF ILLINOIS

MIXING MACHINE

Application filed March 14, 1929. Serial No. 346,843.

This invention relates to mixing machines of that type which employs a rotatable mixing bowl in conjunction with a pair of mixing arms which are moved through the mass in opposite directions through parallel vertical planes in predetermined orbits or paths of movement. The principal object of this invention is to provide novel means whereby the bowl may be tilted to discharge the contents after the mixing operation has been concluded.

Another object is to simplify the mechanism for handling the mixing bowl while being tilted. Another object is to provide novel means for suspending the mixing bowl while it is being tilted and for actuating the suspending means by manually or mechanically operated means. Another object is to provide a swinging supporting connection between the frame of the machine and the bowl in which the bowl is rotatably mounted and capable of being rigidly connected with the frame whereby the gearing for rotating the bowl may mesh perfectly when the bowl occupies its normal position wherein the material is mixed therein. Another object is to provide a novel mixing arm construction.

With these objects and advantages in view, this invention consists in a mixing machine having a rotatable mixing bowl suspended from the frame of the machine by rigid connections and provided with novel means for tilting it in order to discharge its contents. It further consists in a mixing bowl rotatably mounted in a saddle capable of being clamped to the frame of the machine and swingingly supported thereon. It further consists in a machine in which the swinging support is provided with mechanism for swinging the saddle and therewith the bowl away from the frame and finally tilting the bowl into a position for discharging its contents.

It further consists in the several novel features of construction, arrangement and combination of parts hereinafter fully set forth and claimed.

The invention is clearly illustrated in the drawings accompanying this specification in which—

Fig. 3 is a vertical cross section taken on the line 3—3 of Fig. 2, and showing the mixing bowl, in solid lines, in an intermediate position and in dotted lines in a tilted position;

Fig. 4 is a plan of the machine; and

Fig. 5 is a detail fragmental side elevation of certain members of the bowl tilting mechanism, the view being taken in the direction of the arrow 5 in Fig. 2.

Figure 1:
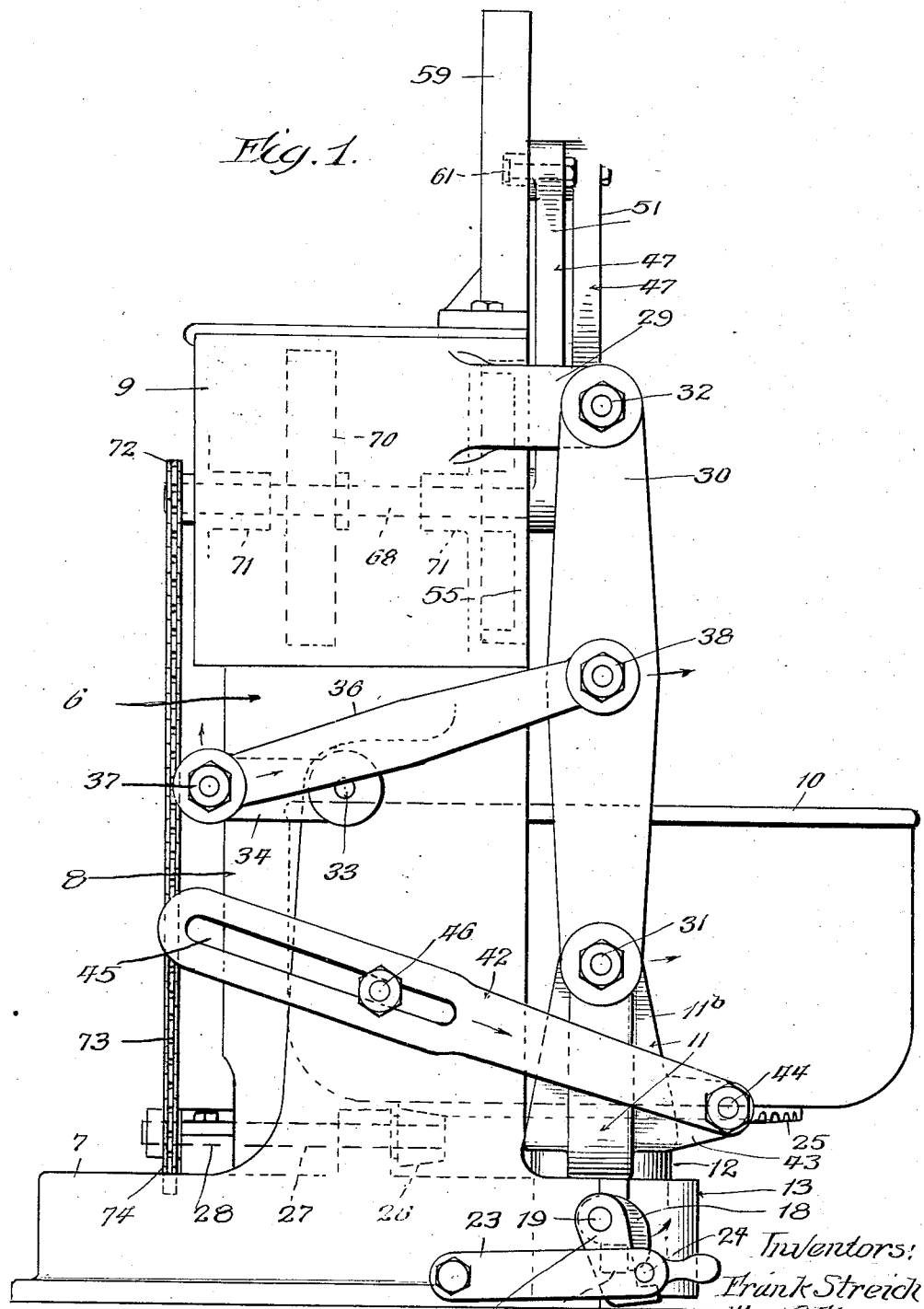
Figure 1 is a side elevation of a mixing machine embodying one form of the present invention.

Referring to said drawings, the reference character 6 designates a frame of solid and substantial construction upon which the operative parts of the machine are mounted. The frame is formed with a widened base portion 7 and with a recessed standard 8 rising therefrom. Upon the standard is mounted a gear case 9 in which are contained certain gears as will appear hereinafter.

The mixing bowl is seen at 10, and said bowl is rotatably mounted in a saddle 11 which extends transversely across the front of the machine and has a downwardly projecting hub member 12 in which is journaled a stud shaft or trunnion 10$^a$ that is secured to and projects down from the bottom of the mixing bowl. At the front of the base 7 means are provided for holding the hub of the saddle in upright position during the mixing operation, and, as shown, said means comprise a clamping member 13 hingedly secured to forwardly projecting ears 14 by an upright pin 15 which extends through an ear 16 formed on the clamping member. The forward end of the base is formed with a semi-cylindrical socket 17 and the clamping member is formed with a companion semi-cylindrical portion which completes a cylindrical socket in which the hub 12 is removably held.

Means are provided for securing the clamping member in clamping position, which means may comprise a latch member 18 mounted upon a rock shaft 19 and arranged to engage with a lug 20 formed upon the free end of the clamping member 13. The rock shaft 19 is rotatably mounted in ears 21 formed on the base 7 and has an arm 22 upon its outer end by means of which the latch 18 may be raised to release the clamping member. A clamp lever 23, pivotally mounted upon the base and having a pin 24 arranged to engage the arm 22 in a wedging action, is provided for pressing the arm 22 back and thereby tightly engaging the latch 18 with the lug 20 of the clamping member 13. By pressing down upon the lever 23, the saddle is tightly clamped to the frame of the machine, and by raising the lever 23, the arm 22 is freed therefrom, whereby said arm may swing upwardly to disengage the latch from the clamping member.

Upon the bottom of the mixing bowl is secured a beveled ring gear 25 which is adapted to mesh with a beveled pinion 26 mounted upon the end of a shaft 27 journaled in bearings 28 carried by the base, and said shaft 27 is rotated by driving means as will be hereinafter explained. During the mixing operation, the shaft 27 is rotated, and, consequently, the mixing bowl is rotated upon its vertical axis.

Pivotally supported upon brackets 29 that project forward from the frame of the machine are two depending bowl supporting arms 30, the lower ends of which are pivotally connected to the saddle 11, and support the saddle and mixing bowl. When freed from the clamping member, the mixing bowl may tilt upon the pivotal connection between the supporting arms 30 and saddle. As shown, the saddle is in the form of a horizontally extending bar 11$^a$ having upturned ends 11$^b$ which are pivotally connected with the supporting arms 30 by bolts or other pivotal connections 31. Conveniently, the pivotal connections between the brackets 29 and supporting arms 30 may comprise bolts or the like 32. From the above, it is apparent that the saddle 11 and therewith the mixing bowl 10 are suspended from the supporting brackets 29, and, when freed from the clamping member, may be swung outward away from the standard 8 of the machine.

Means are provided for swinging the supporting arms 30 upon their pivotal connections with the brackets 29 to thereby move the mixing bowl in a forward direction away from the standard 8. Means are also provided for tilting the mixing bowl upon the pivotal connection between the supporting arms 30 and the saddle 11 after the mixing bowl has been moved beyond the standard 8. The means shown for accomplishing this result will now be described.

Rigidly mounted upon a rock shaft 33, which is journaled in the two side walls of the standard 8 and extends from side to side of the machine, are crank arms 34 and 35, to which are pivotally connected links 36 which extend to and are pivotally connected to the supporting arms 30 intermediate their ends. These pivotal connections may comprise bolts or the like 37 and 38. The crank arm 35 may be in the form of a segmental gear 39 (see Fig. 5) which meshes with a pinion 40 mounted upon a shaft 41 journaled in bearings carried by the standard 8. The pinion and segmental gear may be in the form of worm gears whereby the crank arms 34 and 35 will be locked in any position of adjustment. The shaft 41 may be provided with means whereby a hand crank may be applied thereto or it may be connected with any source of mechanical power whereby it may be driven mechanically. It will be apparent that by rotating the shaft 41 in the proper direction, the crank arms will be partially rotated and the supporting arms 30 swung forward through the instrumentality of the links 36.

For causing the tilting action of the mixing bowl, the saddle 11 is connected to the frame of the machine by a link 42 which has a limited amount of longitudinal movement with respect to the frame, as is clearly seen in Fig. 1. As shown in the drawings, the saddle is provided with a forwardly projecting lug 43 at one end, and the link 42 is pivotally connected to said lug by a bolt 44, or otherwise. The link is formed with a longitudinally extending slot 45 through which projects a stud 46 which is secured to and extends outwardly from the standard 8. It will be apparent that when the hub 12 is released from the clamping member 13 and the supporting arms 30 are moved outwardly, the link 42 will be drawn forward by the saddle, the link riding upon the stud 46 until the rear end of the slot 45 engages with the stud, whereupon the forward movement of the link is arrested. Thereupon the link may fulcrum upon the stud 46, and further forward movement of the supporting arms 30, therefore, swings the saddle and therewith the mixing bowl upon a fulcrum, comprising the connection between the arm 43 of the saddle 11 and link 42 and tilts the mixing bowl 10 into the position shown in dotted lines in Fig. 3, whereupon its contents are discharged.

Associated with the mixing bowl are two mixing arms 47 which are moved in opposite directions through two vertical planes while the mixing bowl is being rotated, said mixing arms having upon their lower ends mixing fingers or paddles 48 which are adjustable lengthwise of the arms. Each of the mixing arms is jointed between its ends, as at 49, to enable the lower part 50 of each arm to be swung upwardly and out of the bowl when the latter is to be tilted. The upper part 51 of each arm is formed with a pair of ears 52 at its lower end between which the lower part 50 of the arm is held and pivoted thereto by a pin 53. A set screw, or other clamping device, 54 is provided in one of the ears 52 for rigidly holding the lower part 50 of the arm in its operative position.

Two crank wheels 55 rotatably mounted in the gear case 9 are provided for oscillating the mixing arms 47, and said crank wheels have wrist pins 56 projecting therefrom which engage in apertures contained in the upper part 51 of each mixing arm. In order to vary the sweep of the mixing arms, the wrist pins are adjustable radially of the crank wheels, and, as shown, are mounted in slide blocks 57 slidably mounted in the crank wheels and having adjustment screws 58 whereby each slide block may be adjusted towards or away from the axis of rotation of the crank wheel in which it is mounted.

Figure 2:
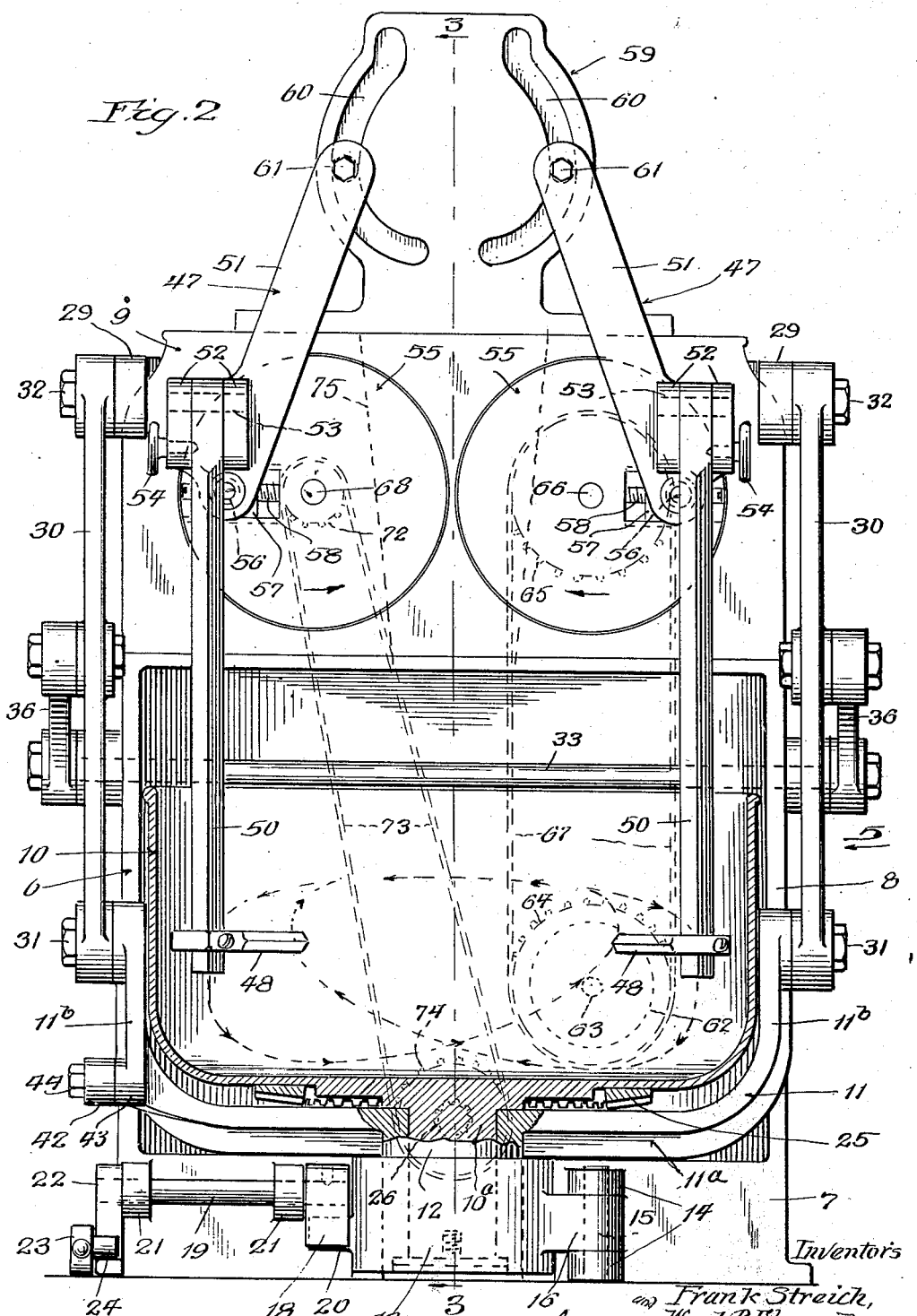
Fig. 2 is a front elevation thereof with the bowl shown in cross section to illustrate parts contained therein.

Supported upon the gear case 9 is a cam block 59 in which are formed two oppositely disposed cam grooves 60 in which travel pins or rollers 61 carried by the upper ends of the mixing arms 47. The cam grooves 60 are shaped so as to control the movement of the upper ends of the mixing arms, whereby their lower ends may take predetermined orbits or paths through the mixing bowl. To obtain the most efficient results, particularly with certain kinds of materials to be mixed, it is desirable to have the mixing fingers travel downward along lines approximately parallel with and close to the side wall of the mixing bowl, and thereafter to follow the curve between the side wall and bottom of the bowl and thence substantially parallel with the bottom of the bowl past the center thereof and then upward and back along curved lines towards the side of the bowl. Such an orbit is indicated by the dotted lines in Fig. 2.

By varying the radius of the wrist pins, and by varying the shape of the cam grooves 60, other orbits or paths of movement may be imparted to the mixing fingers 48, and by advancing the wrist pin on one crank wheel beyond the other, various relative movements may be had between the mixing fingers. This is made possible because the upper ends of the mixing arms are movable independently of each other. However, by obtaining the path of movement described, the mixing fingers are capable of acting on all or practically all of the materials contained in the mixing bowl during the mixing operation, since the rotating bowl carries the mass around with it while the mixing fingers are being thrust through the same. Inasmuch as the mixing fingers move in opposite directions, they pass through and lift up the mass, thereby thoroughly stirring it and mixing it together.

The drive mechanism for the mixing arms and mixing bowl will now be described. Mounted upon the base 7 is an electric motor 61 which furnishes the power for driving the mechanism, and said motor is connected to a speed reducing gear mechanism 62 also mounted upon the base 7. The shaft 63 of the speed reducing gear mechanism has a sprocket wheel 64 thereon which is connected to a sprocket wheel 65 on the shaft 66 of one of the crank wheels 55 by a sprocket chain 67. The shaft 66 and shaft 68 of the other crank wheel 55 are geared together by gear wheels 69 and 70 that may run in oil contained in the hollow of the gear case. The shafts 66 and 68 are journaled in bearings 71 carried by the walls of the gear case 9. On the shaft 68 is a sprocket wheel 72 which is connected to a sprocket wheel 74 on the shaft 27 by a sprocket chain 73. The gearing just described forms a very simple one for transmitting power from the driving motor 61 to the mixing bowl and mixing arms.

Extending through the gear case 9 is a chute 75 through which the ingredients to be mixed may be delivered to the mixing bowl from a point located above the machine. The discharge end of the chute is located above the mixing bowl when the latter occupies the position assumed when clamped to the frame by the clamping member 13.

In the operation of the mixer, the materials to be mixed are deposited in the mixing bowl when the saddle is clamped in place on the frame of the machine. When the motor is started, the bowl is rotated upon its axis and the mixing arms moved in opposite directions through the orbits or paths heretofore described. The mass contained in the mixing bowl is consequently carried around with the bowl and as the mixing fingers pass through the mass they cut through it and lift it from the bottom thereby thoroughly mixing it. When the operation has been completed, the motor is stopped and the clamping member 13 released and swung back from the hub of the saddle. The set screws 54 are then turned back to loosen the lower parts of the mixing arms whereby they may be swung upwardly out of the bowl.

The shaft 41 is then rotated thereby turning the crank arms 34 and 35 upon their axis and moving the links 36 foward. The supporting arms 30 and therewith the saddle 11 and mixing bowl are thereupon moved forward until the end of the slot in the link 42 engages with the stud 46 whereupon the forward movement of the saddle is arrested and, as a consequence, further forward movement of the supporting arms causes the saddle to fulcrum upon its pivotal connection with the link 42 and the continued forward movement of the arms 30 thereupon tilts the saddle 11 and therewith the mixing bowl 10 upon said fulcrum, thereby discharging the contents of the bowl.

Before the bowl is tilted, any material clinging to the mixing arms and fingers is removed therefrom and the arms swung upward out of the path of movement taken by the mixing bowl when being tilted. After the contents of the bowl have been discharged, the shaft 41 is rotated in the reverse direction, thereby returning the mixing bowl into its horizontal position, the mixing arms lowered into the mixing bowl, and the bowl returned to its normal position with the hub of the saddle contained in the socket 17 whereupon the clamping member is secured in place and the machine is ready for another sequence of operation.

In its present form, the mixer has been shown and described for use in mixing dough, and it is highly efficient for this purpose. The machine, however, may be used for mixing other ingredients, as is readily apparent.

More or less variation of the exact details of construction is possible without departing from the spirit of this invention. We desire, therefore, not to limit ourselves to the exact form of the construction shown and described, but intend, in the following claims, to point out all of the invention disclosed herein.

We claim as new, and desire to secure by Letters Patent:

1. In a mixing machine, the combination of a supporting frame, a mixing bowl, suspended, supporting means for said mixing bowl pivotally suspended from said frame upon a fixed fulcrum, and means for moving said supporting means on its fulcrum.

2. In a mixing machine, the combination of a supporting frame, a rotatory mixing bowl, means for rotating said mixing bowl, suspended, supporting means for said mixing bowl pivotally suspended from said frame upon a fixed fulcrum, and means for moving said supporting means upon its fulcrum.

3. In a mixing machine, the combination of a supporting frame, a mixing bowl, a bowl supporting saddle, means for clamping said saddle to the supporting frame, and supporting arms connected to said saddle and pivotally suspended from said frame upon a fixed fulcrum.

4. In a mixing machine, the combination of a supporting frame, a rotatory mixing bowl, a bowl supporting saddle in which said bowl is rotatably mounted, swinging supporting means for said saddle pivotally suspended from said frame upon a fixed fulcrum, and clamping means for securing said saddle to said supporting frame.

5. In a mixing machine, the combination of a supporting frame, a mixing bowl, a bowl supporting saddle in which said bowl is rotatably mounted, said saddle being adapted to be clamped to the supporting frame, supporting arms connected to said saddle and pivotally suspended by said supporting frame, means for moving said supporting arms upon their fulcrum, and a link connection between said saddle and supporting frame having a limited amount of movement relative to the supporting frame, said link and the arm moving means serving to tilt the bowl whereby its contents may be discharged.

6. A mixing machine comprising a supporting frame, a rotatory mixing bowl, a bowl supporting saddle in which said bowl is rotatably mounted, saddle supporting arms pivotally suspended by said frame, means for moving said supporting arms upon their fulcrum, a link connected to said saddle and having a limited amount of movement relative to the supporting frame, and means for releasably clamping said saddle to the supporting frame.

7. In a mixing machine, the combination of a supporting frame, a rotatory mixing bowl, a bowl supporting saddle in which said bowl is rotatably mounted, said saddle having a member adapted to be releasably clamped to the supporting frame, supporting arms connected to said saddle and pivotally suspended by said supporting frame, arm actuating links, and crank arms connected to said links.

8. The combination of a supporting frame, a rotatory mixing bowl, pivotally suspended supporting means for said mixing bowl, and means for swinging said supporting means, including a segmental gear and a pinion.

9. The combination of a supporting frame, a rotatory mixing bowl, pivotally mounted supporting means for said mixing bowl, and means for swinging said supporting means, including a segmental worm gear and pinion.

10. In a mixing machine, the combination of a supporting frame, a rotatory mixing bowl, bowl rotating means, a bowl supporting saddle in which said bowl is rotatably mounted, clamping means for clamping said saddle to the supporting frame, bracket arms upon said supporting frame, bowl supporting arms pivotally suspended from said bracket arms and connected to said saddle, and means connected to said arms and to said saddle for swinging said arms and tilting the saddle and therewith the mixing bowl.

11. In a mixing machine, the combination of a supporting frame having a gear case at its upper end, a chute extending through said gear case, a mixing bowl, and supporting means for said mixing bowl arranged to support said mixing bowl underneath said chute and capable of moving said mixing bowl into a tilted position beyond said frame.

FRANK STREICH.
WARD P. ELWOOD.